A. M. HATFIELD.
GASOLENE LEVEL INDICATOR.
APPLICATION FILED MAY 6, 1914.
1,116,274.
Patented Nov. 3, 1914.
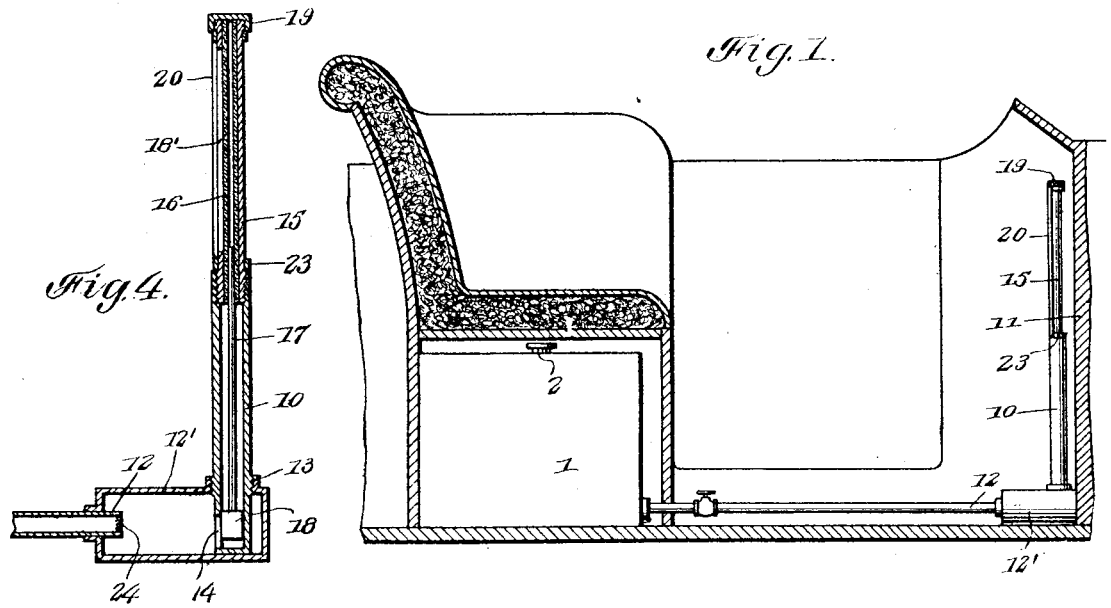
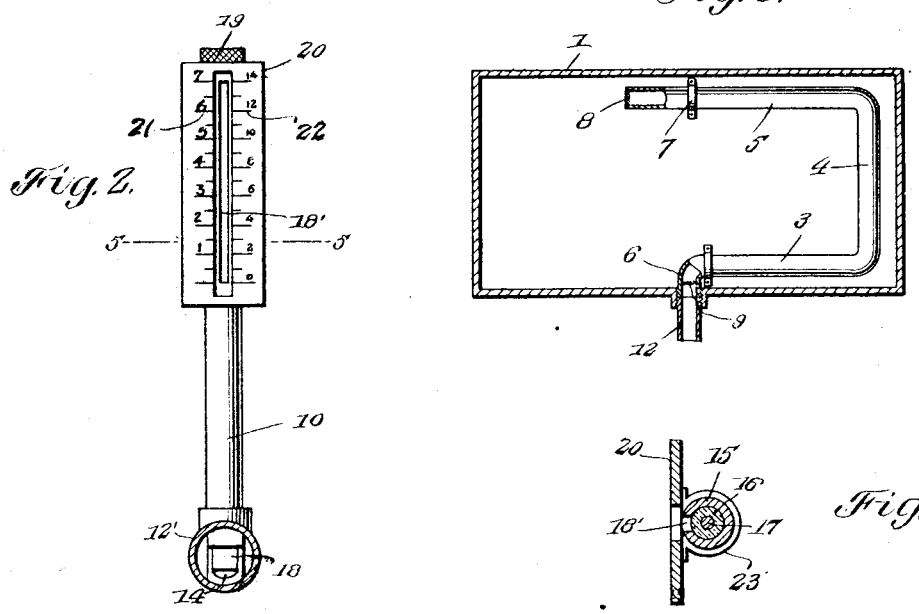
Witnesses
J. H. Crawford
R. M. Smith
Inventor
A. M. Hatfield,
By Victor J. Evans
Attorney

UNITED STATES PATENT OFFICE.

ALONZO M. HATFIELD, OF TIOGA, LOUISIANA.

GASOLENE-LEVEL INDICATOR.

1,116,274.

Specification of Letters Patent.   Patented Nov. 3, 1914.

Application filed May 6, 1914.   Serial No. 836,714.

*To all whom it may concern:*

Be it known that I, ALONZO M. HATFIELD, a citizen of the United States, residing at Tioga, in the parish of Rapides and State of Louisiana, have invented new and useful Improvements in Gasolene-Level Indicators, of which the following is a specification.

This invention relates to gasolene supply level indicators especially for use in connection with motor vehicles, the object of the invention being to provide a particularly reliable and steady indicator of the class described which is not subject to the usual fluctuations present in devices of this kind and which will therefore show the exact level and incidentally the quantity of gasolene at any time contained within the supply tank of a motor vehicle, the construction enabling the graduated scale plate of the device to be located at any suitable point such as on the dash board of the vehicle.

With the above and other objects in view, the invention consists in the novel construction, combination and arrangement of parts, as will be hereinafter more fully described, illustrated and claimed.

In the accompanying drawings:—Figure 1 is a sectional view through a sufficient portion of an automobile to illustrate the nature and application of the present invention. Fig. 2 is a vertical cross section showing a face view of the scale plate and contiguous parts. Fig. 3 is a horizontal section through the gasolene tank showing the equilibration tube. Fig. 4 is an enlarged vertical section through the stand pipe, drum and contiguous parts. Fig. 5 is a detail horizontal section on the line 5—5 of Fig. 2.

Referring to the drawings 1 designates a gasolene supply or storage tank such as is used on motor vehicles of all kinds for supplying the usual internal combustion engine, said tank being shown as provided with the usual filling opening and cap indicated at 2.

In carrying out the present invention I provide an equilibration tube which is shown in plan view in Fig. 3, said tube embodying a plurality of runs 3, 4 and 5, the initial run 5 being preferably of a length slightly greater than one half the length of the tank and the terminal run 3 being approximately one half the length of the tank so that the discharge end 6 may extend through the front wall of the tank about centrally between the ends of said tank. The remaining run 4 of the tube is merely a cross connection between the terminal run 3 and the initial run 5. All of the runs are arranged in a common horizontal plane and rest against the bottom of the tank to which they are secured by one or more straps 7.

In the receiving end of the initial run 5 there is arranged a combined strainer and liquid brake 8 while in the discharge end 6 there is arranged a similar combined strainer and liquid brake 9. Each of these strainers and brakes is composed preferably of meshed wire gauze of any suitable fineness to prevent grit and like material from passing through the feed pipe to the carbureter and also to offer sufficient resistance to the free flow of the gasolene to prevent serious fluctuations in said flow which might affect the carbureter and which would certainly affect the indicator to be hereinafter described.

10 designates a stand pipe which is shown as arranged in close proximity to the dash 11 of the motor vehicle to which it may be fastened in any approved manner. The stand pipe 10 is connected at its lower end to the discharge end of the equilibration tube by means of a tubular connection or pipe 12 leading into a drum 12′ of larger diameter, the same being formed in its upper side with an opening 13 to receive the lower end of the stand pipe 10 which is secured with a liquid-tight joint to the drum 12′ and provided in its lower extremity with a slot or aperture 14 to allow the gasolene to pass from the drum 12′ into the stand pipe where it seeks the same level as in the tank 1.

The upper extremity of the stand pipe 10 is internally threaded to receive a tubular casing 15 the internal diameter of which is just sufficient to receive a transparent tube 16 of glass or like material while slidingly mounted in the tube 16 is an indicating stem 17 the lower end of which is connected to a float 18 of any suitable construction which rises and falls in accordance with the level of gasolene in the stand pipe 10, the upper portion of the indicating stem 17 being visible through the transparent tube 16. The casing 15 is formed with a longitudinal slot 18' so that the position of the indicating stem 17 may be observed at a glance.

19 designates a cap or plug for sealing the upper end of the casing 15.

20 designates a scale plate which is preferably provided at one side with graduations 21 marked off in inches and fractions thereof to correspondingly designate the depth of gasolene in the tank 1 while at the opposite side said scale plate is marked off with graduations 22 to indicate the number of gallons or fractions thereof remaining in the tank. The scale plate is fastened at suitable points such as the top and bottom thereof to the casing 15 by means of bands or straps 23.

If desired, an additional combined strainer and liquid brake 24 may be arranged in the connection or pipe 12 adjacent to the lower end of the stand pipe 10 to overcome any fore and aft movement of the gasolene in said connection 12.

From the foregoing description taken in connection with the accompanying drawings it will now be seen that the level of gasolene in the tank 1 is always visibly indicated on the scale plate which may be arranged at any convenient point in the vehicle and the operation of the indicating stem is rendered steady by reason of the special form and arrangement of the equilibration tube in the bottom of the tank 1. The greatest movement of the gasolene in the tank is, of course, in the direction of length of the tank and it is for that reason that I employ the two runs 3 and 5 and connect them by the short cross run 4 and terminate the final run 3 in the short forwardly extending elbow portion which passes through the center of the tank. The strainers materially check the movement of the liquid both in a lateral and fore and aft direction and thus the fluctuations of the gasolene are practically eliminated before they reach the stand pipe 10. Therefore the float 18 remains quite steady and also the indicating stem 17.

What I claim is:—

A gasolene supply level indicator for motor vehicles, comprising in combination with a gasolene tank, an equilibration tube embodying a plurality of runs disposed at an angle to each other but all extending and lying in a common horizontal plane in the bottom of the tank, combined strainers and liquid brakes incorporated in runs of said tube which are disposed in angular relation to each other, a stand pipe, a connection between said stand pipe and the discharge end of said equilibration tube, a float in said stand pipe, a tubular vertical casing extending upwardly from the upper end of said stand pipe and formed with a vertical slot, a transparent tube within said casing, a level indicating stem extending from said float and movable in said transparent tube, and a graduated scale adjacent to said stem and transparent tube.

In testimony whereof I affix my signature in presence of two witnesses.

ALONZO M. HATFIELD.

Witnesses:
O. C. BUTLER,
W. L. DICKERSON.